United States Patent [19]
Speece

[11] 3,804,255
[45] Apr. 16, 1974

[54] RECYCLING GAS CONTACT APPARATUS
[76] Inventor: Richard E. Speece, Drexel University, Philadelphia, Pa. 19104
[22] Filed: Oct. 18, 1972
[21] Appl. No.: 298,576

[52] U.S. Cl. .................. 210/194, 210/218, 210/221, 261/29
[51] Int. Cl. ............................................... B03d 1/00
[58] Field of Search ....... 55/53, 159, 183, 185, 196; 210/150, 151, 170, 194, 196, 209, 218, 221, 261/91, 93, 29

[56] References Cited
UNITED STATES PATENTS
| 1,900,809 | 3/1933 | Hammerly | 210/194 |
| 2,638,444 | 5/1953 | Kappe | 210/194 |
| 3,477,947 | 11/1969 | Kappe | 210/194 X |
| 3,643,403 | 2/1972 | Speece | 55/53 |
| 2,294,827 | 9/1942 | Booth | 55/196 X |
| 3,502,444 | 3/1970 | Westerlund | 55/159 X |

Primary Examiner—John Adee
Assistant Examiner—Robert H. Spitzer
Attorney, Agent, or Firm—Clarence A. O'Brien; Harvey B. Jacobson

[57] ABSTRACT

Recycled fluent material confined to a downflow stream of decreasing velocity within a gas transfer device to absorb a gas by prolonged contact therewith. The gas is injected as bubbles in the flow stream. The fluent material is recycled through the gas transfer device from an upper portion within a tank just below an upper surface or interface maintained at a predetermined level.

8 Claims, 5 Drawing Figures

3,804,255

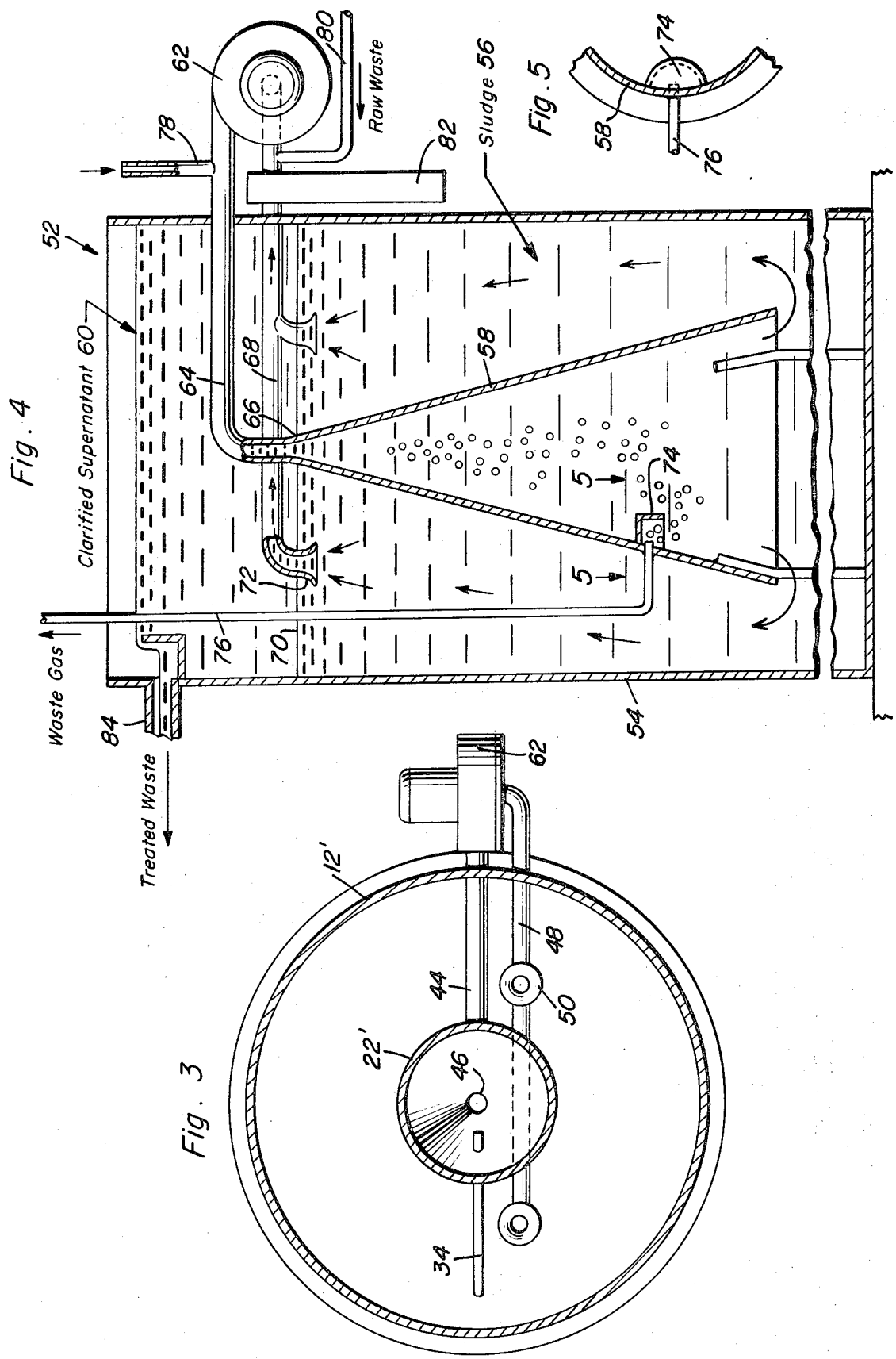

RECYCLING GAS CONTACT APPARATUS

This invention relates to the transfer of gas to a fluent material including liquids, sludges, slurries, etc., by prolonged contact in a relatively moving or turbulent environment and to the recycling of such fluent material through the gas contact zone.

In my prior U.S. Pat. No. 3,643,403, an efficient method has been disclosed for aerating an unconfined body of water with air or oxygen by inducing a downflow within the body of water into which bubbles of gas are injected in such a manner that the bubbles are carried by the flow stream to a stagnation region where the upward buoyant velocity of the bubbles is equal to the downflow velocity of the water. A gas contact zone is thereby established from which any remaining gas bubbles are displaced by "crowding" and within which prolonged contact between the gas and water enhances absorption of the gas. The adaptation of the foregoing method to various processes such as hydrogenation, production of single cell protein from hydrocarbons and treatment of waste material, in accordance with the present invention, has enhanced such processes to an unexpected degree and accounts for an increased efficiency in the operation of processing apparatus and in some applications may reduce the size and/or the amount of equipment required.

An important feature of the present invention resides in the confinement of a body of fluent material to be treated by an injected gas, to a container or tank of predetermined dimension so as to establish an upper surface or interface adjacent to which the fluent material is drawn for recycling through the gas contact zone. The fluent material is recycled by either an impeller in the inlet throat of the conical downflow passage or by a pump having its discharge conduit connected to the inlet end of the downflow passage while its intake withdraws the fluent material from a region just below the upper surface or interface aforementioned. Gas such as air or oxygen may be injected from a suitable external source into the downflow stream either below the inlet end of the downflow passage or carried into the downflow stream with the discharge from the recycling pump.

The container for the fluent material may be pressure sealed in connection with certain processes to which the present invention is applied such as the transfer of oxygen to a yeast culture. In other processes such as oxygen activated sludge treatment, fluent material in the form of a sludge is confined below a clarified supernatant product and is recycled through the gas contact zone by a pump having its intake extending just below the interface established between the sludge and the less dense product accumulated thereabove.

A particularly advantageous attribute of apparatus constructed in accordance with the present invention is the extent to which turbulence is confined to the gas contact zone or downflow passage because of the relatively low velocity of the fluent material at the lower outlet end of the downflow passage and the substantially zero velocity of any remaining bubbles of gas at the outlet end. By harvesting the remaining gas bubbles reaching the stagnation region and venting the gas so accumulated, turbulence externally of the contact zone may be virtually eliminated within the remaining portion of the container. The container may accordingly be dimensioned as a settling tank to accommodate solids separation. The solids separation capability of apparatus constructed in accordance with the present invention is thereby significantly increased as compared to prior equipment of comparable size and material handling capacity. In some cases a secondary clarifier otherwise required may be eliminated.

These together with other objects and advantages which will become subsequently apparent reside in the details of construction and operation as more fully hereinafter described and claimed, reference being had to the accompanying drawings forming a part hereof, wherein like numerals refer to like parts throughout.

FIG. 3 is a transverse sectional view taken substantially through a plane indicated by section line 3—3 in FIG. 2.

FIG. 4 is a side sectional view of apparatus constructed in accordance with yet another embodiment of the invention.

FIG. 5 is a partial sectional view taken substantially through a plane indicated by section line 5—5 in FIG. 4.

Figure 1:
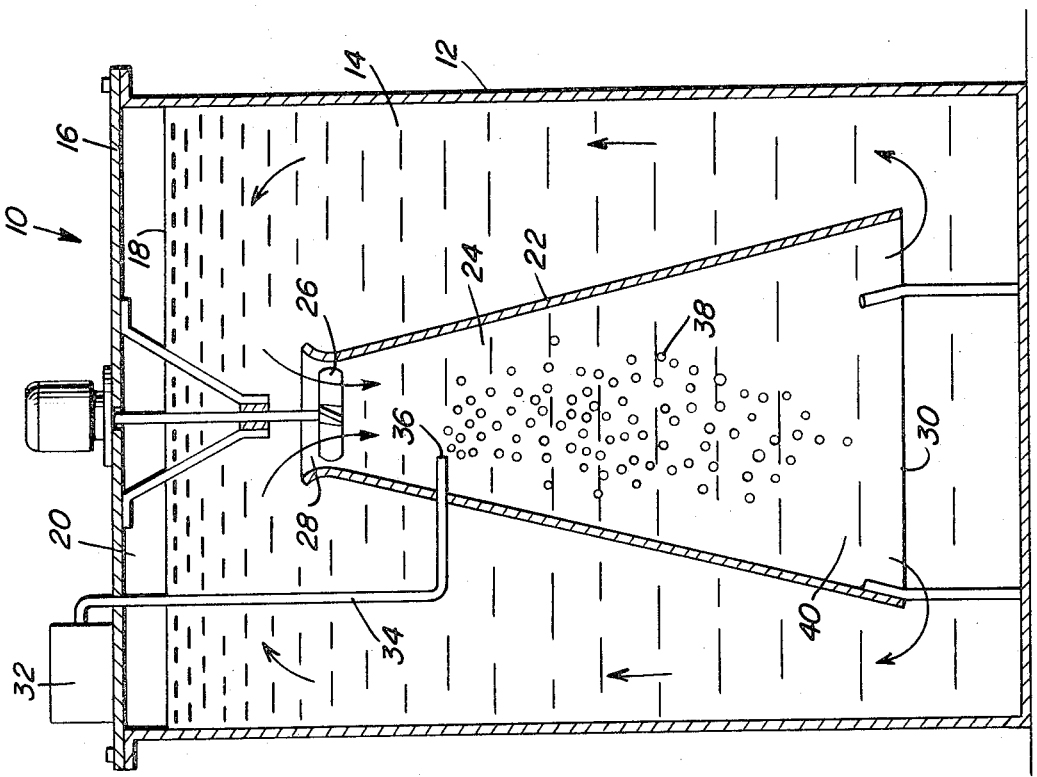
FIG. 1 is a side sectional view through apparatus constructed in accordance with one embodiment of the present invention.

Referring now to the drawing in detail, FIG. 1 illustrates apparatus generally referred to by reference numeral 10. In this embodiment of the invention, a container or tank 12 of predetermined dimension encloses a confined body of fluent material such as a liquid 14. The tank is pressure sealed by a top cover 16 in order to maintain the upper surface 18 of the liquid at a predetermined level under a desired pressure in the gas space 20.

A downflow conducting cone member 22 is fixedly positioned within the tank to confine flow or form a downflow passage 24 for liquid. Flow of the liquid is induced by a powered impeller 26 positioned within the upper inlet throat 28 of the cone member. The downflow velocity of the liquid will accordingly decrease from a maximum value at the upper inlet throat to a minimum value at the lower outlet end 30 of the downflow passage in view of its downwardly diverging flow area. The outflow of liquid from the downflow passage is of a relatively low velocity so that there is a correspondingly slow rise of fluent material from the bottom of the tank. Further, liquid is drawn into the inlet throat 28 by the impeller 26 from a region just below the upper surface 18 of the body of liquid.

A source of gas under pressure 32 is located externally of the tank 12 and is connected by a gas supply conduit 34 to a gas bubble injector 36 located within the downflow passage below the inlet throat. The injection of gas bubbles into the downflow stream is at such location relative to the flow stream that the upward buoyant velocity of all of the bubbles 38 are less than the downstream velocity so that the bubbles are carried to a stagnation region 40 adjacent the outlet end 30. In the stagnation region the bubbles have a substantially zero resultant velocity so that they are displaced or "crowded" out of the downflow passage by accumulation of bubbles thereabove as explained in my prior U.S. patent aforementioned. An efficient gas contact zone is thereby established within the downflow passage 24 through which the liquid 14 is recycled until a desired quantity of gas is transferred to or absorbed by the liquid under controlled pressure conditions in the pressure sealed vessel 12.

Figure 2:
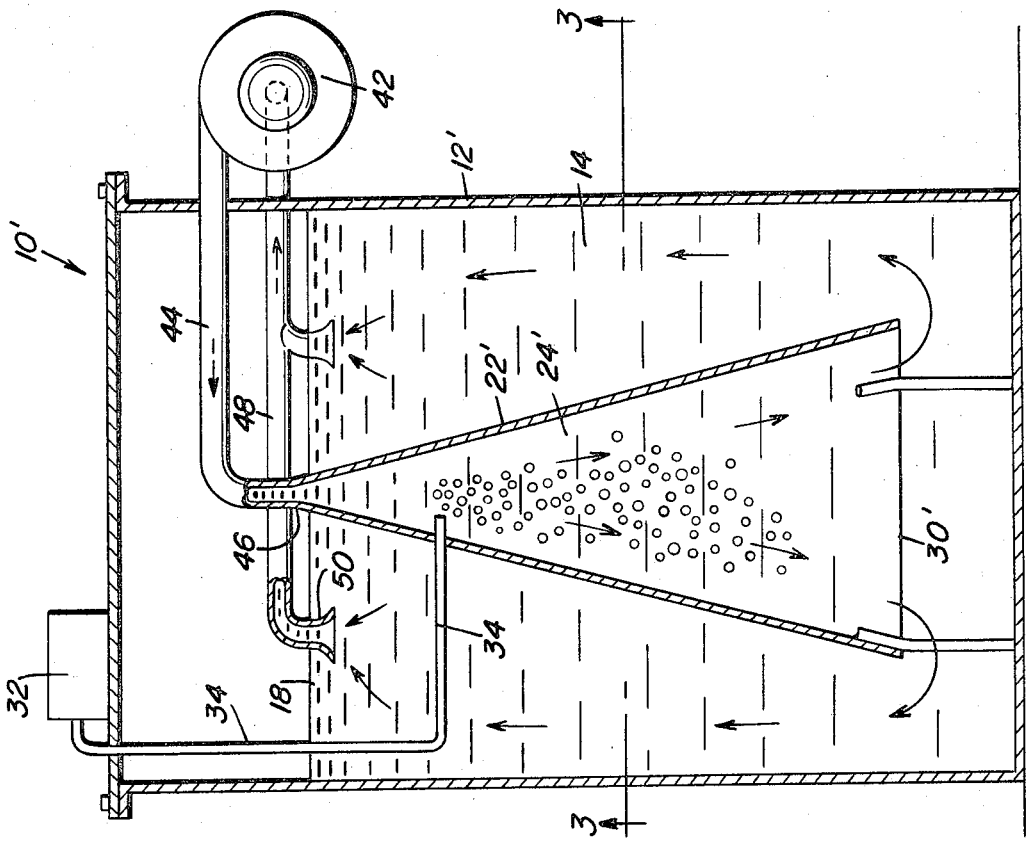
FIG. 2 is a side sectional view of apparatus constructed in accordance with another embodiment.

FIGS. 2 and 3 illustrate another embodiment 10' similar in construction and operation to apparatus 10 of FIG. 1, in that the liquid 14 is enclosed in a pressure sealed tank 12' within which a downflow conducting cone 22' is fixedly mounted to form a downflow passage 24'. Gas from source 32 is also supplied by conduit 34 to the passage 24' for absorption by the liquid emerging from the lower outlet end 30' and recycled from a region adjacent to the upper surface 18. In the apparatus 10', however, the liquid is recycled by means of a pump 42 having a discharge conduit 44 connected to the upper inlet end 46 of the downflow cone 22'. An intake conduit 48 connected to the pump is provided with inlet portions 50 having openings located just below the upper surface 18 of the body of liquid.

A fluidized bed type of biological reactor utilizing the basic gas contact method illustrated in FIGS. 1 and 2, is shown in FIG. 4 with its gas transfer apparatus 52 mounted internally of settling tank 54. This apparatus utilizes a recycling method for the fluent material being treated, similar to that described in connection with FIG. 2. Further, the present invention also contemplates mounting of the gas transfer apparatus externally of the settling tank.

The settling tank 54 of the reactor is dimensioned to accommodate solids separation within a body of sludge 56 as shown in FIG. 4 constituting the recycling fluent material being treated by absorption of air or oxygen in gaseous form within a downflow conducting member 58 in a manner similar to the other described embodiments of the invention. Thus, treated sludge is discharged from the gas transfer apparatus into the bottom of the tank with low entrance energy. In view of the type of material 56 being treated and the solids separation process occurring in the tank 54, a less dense product or clarified supernatant 60 is accumulated above the body of sludge being recycled through the gas transfer apparatus. The sludge is recycled by means of a pump 62 having its discharge conduit 64 connected to the upper inlet end 66 of the cone member 58. The pump intake conduit 68 withdraws sludge through the inlet portions 72 of the intake conduit from a region just below the interface 70 between the body of sludge and the less dense product 60.

The solids separation capability of the settling tank 54 and the stability of the interface 70 is preserved by confining turbulence to the gas contact zone inside of the cone 58. Toward this end, a bubble harvesting member 74 is fixed internally to the cone 58 at the bubble stagnation region as shown in FIGS. 4 and 5. Bubbles of gas will accordingly be collected below the harvester member by the "crowding" action aforementioned, including bubbles of waste gases such as nitrogen and carbon dioxide. These gases are vented to atmosphere through a vent tube 76 connected to the cone within the bubble harvester 74. Thus extraneous gases cannot accumulate to detrimental levels within the gas absorption system described.

The sludge activating gas is introduced to the apparatus 52 through a supply conduit 78 connected to the pump discharge conduit 64 as shown in FIG. 4. The sludge 56 is derived from raw waste added to the recycling sludge in the pump intake conduit by means of the conduit 80 on the upstream side of a carbon dioxide stripping component 82 of conventional design through which the recycled sludge is conducted. The product 60 is drawn off from the top of the tank as treated waste by an outlet 84 located above the interface 70 between the product and the recycling sludge. The stripping component 82 prevents the carbon dioxide level from becoming too high and inhibiting biological activity in the sludge because of pH depression.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. Apparatus for transferring a gas to a fluent material, comprising a container enclosing a body of said fluent material below an upper surface, downflow conducting means for confining flow of the fluent material to a flow stream of maximum velocity at an upper inlet end decreasing to a minimum velocity at a lower outlet end, flow inducing means for recycling flow of the fluent material through the inlet end of the downflow conducting means from a region within the container in spaced adjacency below said upper surface, and gas injecting means connected to the flow conducting means at a predetermined location below the inlet end for introducing said gas into the flow stream at an initial buoyant bubble velocity less than the velocity of the flow stream to convey all bubbles of the gas to a stagnation zone of zero bubble velocity within the flow conducting means in spaced adjacency above the lower outlet end, whereby no bubbles rise within the container to said upper surface, and bubble harvesting means for collecting bubbles of gas within the stagnation zone and means for venting the gas collected by the harvesting means to substantially prevent turbulence within the container externally of the downflow conducting means.

2. The combination of claim 1 wherein the flow inducing means includes a recycling pump having a discharge conduit connected to the inlet end of the downflow conducting means and an intake conduit, and inlet means connected to the intake conduit having at least one intake opening located in spaced adjacency below the upper surface of the body of fluent material.

3. The combination of claim 2 wherein the container constitutes a settling tank dimensioned to accommodate solids separation within the fluent material and formation of a fluent product of reduced density above the upper surface of the fluent material.

4. The combination of claim 3 including means connected to the intake conduit for introducing raw waste into the fluent material being recycled and outlet means connected to the container above said upper surface of the fluent material for withdrawing the fluent product as treated waste.

5. The combination of claim 4 wherein said gas injecting means is connected to the pump outlet conduit to convey oxygen entrained in the bubbles to the inlet end of the downflow conducting means.

6. The combination of claim 1 wherein the container constitutes a settling tank dimensioned to accommodate solids separation within the fluent material and formation of a fluent product of reduced density above the upper surface of the fluent material.

7. The combination of claim 1, wherein said bubbles collected within the bubble harvesting means are waste gas components not absorbed by the fluent material.

8. The combination of claim 7 wherein the gas introduced by the gas injecting means is air.

* * * * *